(No Model.)

W. C. SALMON.
STEAM COOKING APPARATUS.

No. 429,099. Patented May 27, 1890.

Witnesses:

Inventor:
William C. Salmon,
By James L. Norris
Atty.

UNITED STATES PATENT OFFICE.

WILLIAM C. SALMON, OF STEUBENVILLE, OHIO.

STEAM COOKING APPARATUS.

SPECIFICATION forming part of Letters Patent No. 429,099, dated May 27, 1890.

Application filed December 20, 1889. Serial No. 334,416. (No model.)

*To all whom it may concern:*

Be it known that I, WILLIAM C. SALMON, a citizen of the United States, residing at Steubenville, in the county of Jefferson and State of Ohio, have invented new and useful Improvements in Steam Cooking Apparatus, of which the following is a specification.

My invention relates to certain improvements in the steam cooking apparatus for which Letters Patent No. 367,240 were issued to me July 26, 1887; and the purpose of my present improvement is to provide an apparatus of this type in which the steam generator or boiler may be either constantly or intermittently supplied with boiling water from a superimposed reservoir heated by said boiler, the parts being so arranged that the latter may be replenished by a faucet delivering the boiling water directly to the boiler or to a pocket or gage-cup communicating therewith.

It is a further purpose of my invention to provide a novel arrangement of parts whereby any water of condensation resulting from the egress of steam at the joints of the sections comprising the steam-conducting pipe will flow down the exterior thereof and be conveyed into the steam generator or boiler, thus avoiding sizzling, which would result from the water striking a hot stove-plate, while contributing to the water-supply of the generator or boiler, and also avoiding danger of cracking the stove-plate, as might occur where the water strikes the hot metal.

It is my further purpose to simplify and improve the construction and operation of the tea and coffee section, to provide a gage-glass therefor, and to combine with the drip-pan a simple and easily attachable and detachable filter supported on the drip-pan.

The invention consists in the several novel features of construction and new combinations of parts hereinafter fully set forth, and then definitely pointed out in the claims following this specification.

To enable others skilled in the art to make and use my said invention, I will now describe the same in detail, reference being made to the accompanying drawings, in which—

Figure 1:
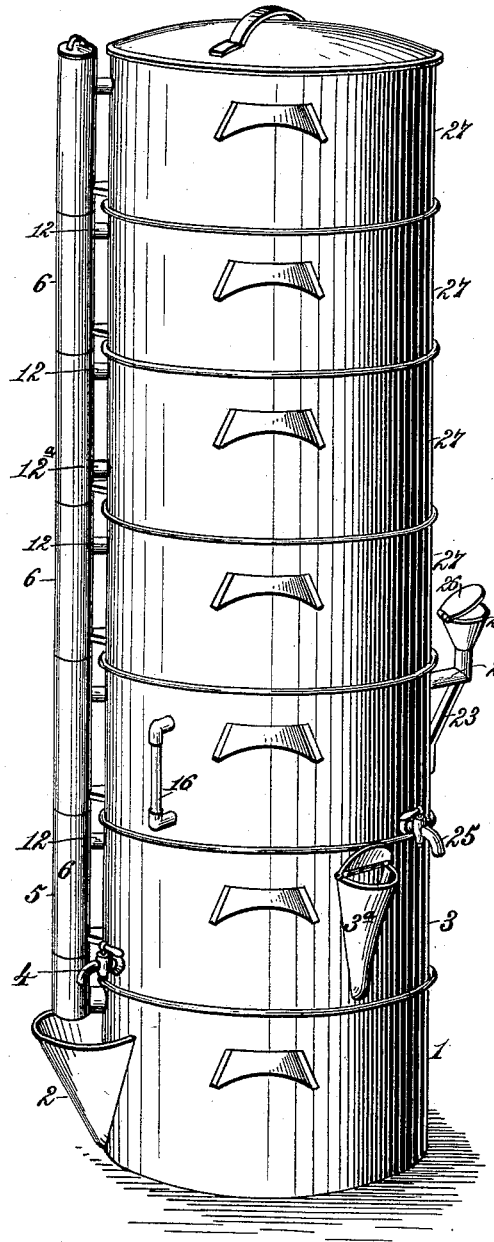
Figure 2:
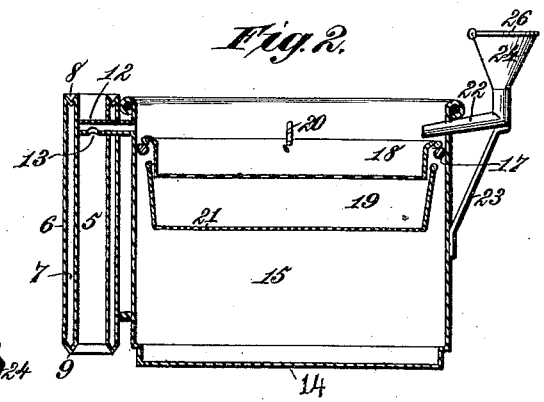
Figure 3:
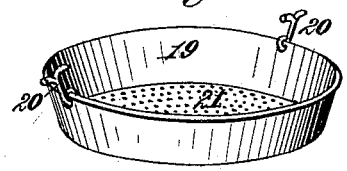
Figure 4:
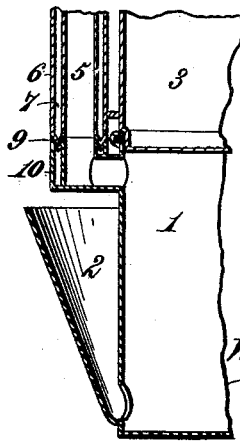

Figure 1 is a perspective view of a steam cooker embodying my invention. Fig. 2 is a sectional view of the tea and coffee section. Fig. 3 is a detail view of the filtering-pan removed. Fig. 4 is a detail section of the lower end of the steam-pipe showing the cut-off or cross-pipe and the gage-cup on the boiler.

In the said drawings, the reference-numeral 1 designates the steam generator or boiler, which is preferably of cylindrical form and provided with an open gage-cup or pocket 2, which projects from the vertical wall of the boiler and communicates with its interior to enable its contents to be replenished and to indicate to the operator the quantity of water present in the boiler.

Upon the boiler 1 is mounted a cylindrical reservoir 3, containing water which is heated by the steam generated by the boiler 1. This reservoir is provided with a cock or faucet 4, arranged to deliver the water from the reservoir into the gage-cup 2 and replenish the boiler without the necessity of using a vessel to transfer the water from one to the other. A gage-cup and filler $3^a$ is mounted on the wall of the reservoir to show the depth of water and permit it to be replenished.

Mounted upon the vertical wall of the reservoir 3 is a section 5 of the steam-conveying pipe jacketed by an outer pipe 6, a dead-air space or packing-space 7 being left between the two pipes to prevent loss by radiation. The upper end of this section, which is upon a level with the top of the reservoir, or nearly so, is provided with a circumferential groove or channel 8, and its lower end is provided with a double bevel 9, adapted to fit within a channel or groove similar to 8 and formed in a coupling 10, permanently connected to the top portion of the boiler 1. Entering this pipe from the reservoir 3 is a steam-supply branch pipe 12, which projects into the pipe 5, but is of less diameter, whereby steam is enabled to pass around it and rise in the next connected section. The end of the pipe lying in the steam-pipe 5 is provided on its lower side with an opening 13, by which a portion of the steam flowing through the vertical pipe may pass into the upper part of the reservoir and heat the vessel or section superimposed thereon. Each of the vessels or sections is provided with a shallow contracted bottom portion 14, which fits as accurately within the open top of the vessel or section next below.

Mounted upon the reservoir 3 is a coffee and tea section 15, provided with a jacketed pipe-section 5 like that upon the reservoir, and fitting at its beveled lower end within the circumferential channel 9 in the pipe-section upon the reservoir. The coffee-section is provided with a gage-glass 16, of any suitable construction, and upon the interior cylindrical face, a little below the top of the section, is attached a ring 17, upon which the flange of a drip-pan 18 catches. This drip-pan is a shallow vessel, having its bottom perforated with numerous small openings. Directly beneath this drip-pan is suspended the filtering-pan 19, which is provided with catches or hooks 20, engaging the edges of the drip-pan. The filtering-pan has a perforated bottom 21, and is of sufficient depth to contain the required quantity of ground coffee. Entering the wall of the section is a pipe 22, having its open end overhanging the drip-pan, while upon its outer end, which is supported by a brace 23, is mounted a funnel-shaped cup 24 to receive boiling water. This supply-pipe is arranged, preferably, on the side opposite the steam-supply pipe, from which steam will flow and condense in sufficient quantity to furnish a limited drip to the pan. A faucet 25 is placed in the wall at or near the bottom of the section to withdraw the contents, and a cap 26 is mounted on the funnel to prevent the escape of steam.

The remaining sections 27 may be of any desired construction, according to the purpose for which each is to be used, and each section is provided with a section of jacketed steam-supply pipe similar to those upon the boiler and reservoir, and already described, each pipe-section having a double beveled lower end and being provided with a circumferential channel, whereby the several sections join to form a continuous pipe. From the upper portion of each vessel a branch pipe 12 projects, similar to that already described in connection with the reservoir.

In the construction described it is essential that the steam-conducting pipe be made in sections, the contiguous ends of which fit each other; but I find that steam will pass the joints, and the water of condensation resulting therefrom flows down the pipe. To return such water of condensation to the generator or boiler and avoid sizzling or the hissing sound which would result from the water flowing onto a hot stove, I so organize and relatively arrange the several parts of the cooker that the lower end of the sectional steam-conducting pipe overhangs and is in alignment with the upper open end of a lateral gage-cup 2, whereby any water of condensation resulting from the passage of steam at the joints of the pipe-sections will flow upon the exterior thereof and drip into the gage-cup, from whence it will be delivered direct to the generator or boiler. This arrangement not only avoids sizzling, but contributes to the water-supply of the generator or boiler, and also avoids the danger of cracking the hot stove-plate. The faucet 4 of the water-reservoir also overhangs the gage-cup 2, and therefore the attendant can at pleasure supply the boiler through the gage-cup, or draw hot water for coffee, tea, or any other purpose. The reservoir containing water, which is heated to boiling by the steam-generator below, also provides means for replenishing the latter at any moment and to any amount without arresting the generation of steam. In many kinds of baking, as well as in the cooking of meat, a sudden cessation in the flow of steam is liable to seriously injure the food and may render it unfit for use. The reservoir also furnishes a supply of hot water for the coffee and tea section, as well as for the dishes and general purposes.

I may, if desired, use two steam-inlet tubes 12 and 12$^a$, one entering the section at the top and the other at the bottom, as shown in Fig. 1.

What I claim is—

1. In a steam cooking apparatus, the combination, with a boiler having an exterior lateral gage-cup, of a series of vessels superimposed on the boiler, each vessel having an external pipe-section attached to its outside and such sections united end to end to form a continuous steam-supply pipe arranged in alignment with the lateral gage-cup to discharge the water of condensation directly thereinto, and lateral steam-conducting branch pipes respectively placing the pipe-sections in communication with the vessels, substantially as described.

2. The combination, with a boiler having an exterior lateral gage-cup and a series of vessels superimposed on said boiler, of a sectional steam-supply pipe located outside the vessels and in alignment with the said gage-cup to discharge the water of condensation directly thereinto, and branch pipes respectively connecting the steam-supply pipe with the vessels, substantially as described.

3. In a steam cooking apparatus, the combination, with a boiler having an exterior lateral gage-cup, of a series of vessels superimposed on the boiler, a steam-supply pipe composed of jacketed sections united end to end in alignment with the gage-cup to discharge the water of condensation directly thereinto, and branch pipes respectively connecting the pipe-sections with the vessels, substantially as described.

4. In a steam cooking apparatus, the combination of a boiler having an exterior gage-cup, a water-reservoir resting directly on said boiler, a steam-pipe connection between the upper part of the boiler and the upper part of the water-reservoir, a cooking-vessel resting on the reservoir, and a cock or faucet projecting from the reservoir over the gage-cup for filling the boiler therethrough, substantially as described.

5. In a steam cooking apparatus, the combination of a boiler having an external gage-cup, a water-reservoir resting on the boiler and having a cock or faucet arranged to discharge into the gage-cap, a series of cooking-vessels supported by the water-reservoir, and a steam-supply pipe leading from the boiler and connected with each cooking-vessel, substantially as described.

6. In a steam cooking apparatus, the combination of a boiler having an exterior gage-cup, a water-reservoir resting on the boiler and having a cock or faucet projecting directly over the gage-cup to discharge thereinto, a series of cooking-vessels supported by the reservoir, a sectional steam-pipe located outside the vessels in alignment with the gage-cock to discharge the water of condensation directly thereinto, and branch pipes respectively connecting the pipe-sections with the cooking-vessels, substantially as described.

7. In a steam cooking apparatus, the combination, with a boiler or steam-generator adapted to supply steam by an exterior sectional pipe to a series of superimposed vessels, of a coffee and tea section having a removable drip-pan, a filter-pan provided with catches engaging the drip-pan and suspending the filter-pan beneath the latter, and a supply-pipe entering the wall and discharging into the drip-pan, said cup having a cover and the section being provided with a gage-glass and draw-off, substantially as described.

8. In a steam cooking apparatus, the combination, with a boiler or steam-generator, of a series of cooking-vessels superimposed thereon, each having an external section of steam-pipe secured to its outside and communicating with the sections upon adjacent vessels, and one or more of the latter being provided, also, with a steam-inlet pipe entering at or near the bottom and another steam-inlet entering at or near the top, substantially as described.

In testimony whereof I have affixed my signature in presence of two witnesses.

WILLIAM C. SALMON.

Witnesses:
GEORGE W. FOGG,
GEORGE HAUMAM.